(No Model.)  5 Sheets—Sheet 1.

C. M. BANKS, Dec'd.
E. J. BANKS, Administratrix.
BABY CARRIAGE.

No. 357,566.  Patented Feb. 15, 1887.

WITNESSES:  INVENTOR
Wm H. Van Horn  Ella J. Banks,
Chas F. Van Horn  administratrix of
  Charles M. Banks deceased
  By S. J. Van Stroosen
  ATTORNEY (No Model.)  5 Sheets—Sheet 2.

C. M. BANKS, Dec'd.
E. J. Banks, Administratrix.
BABY CARRIAGE.

No. 357,566.  Patented Feb. 15, 1887.

(No Model.) 5 Sheets—Sheet 3.
C. M. BANKS, Dec'd.
E. J. BANKS, Administratrix.
BABY CARRIAGE.
No. 357,566. Patented Feb. 15, 1887.
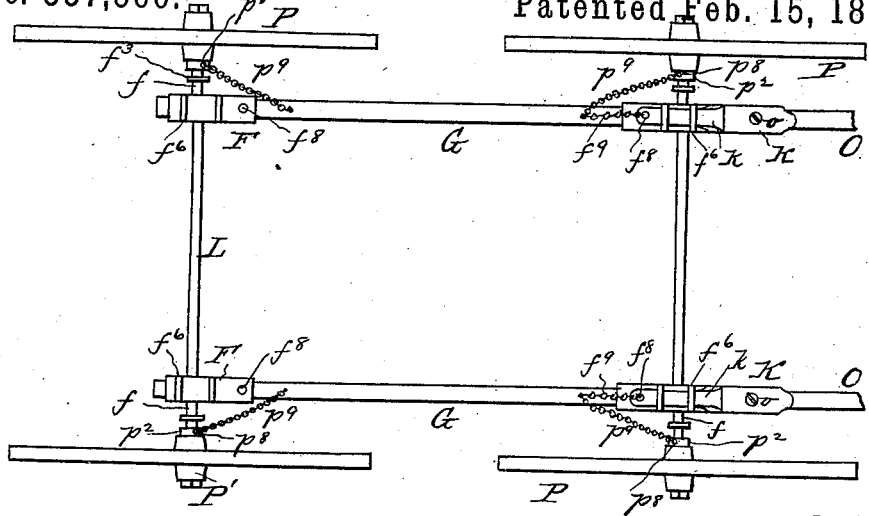
Fig. 5
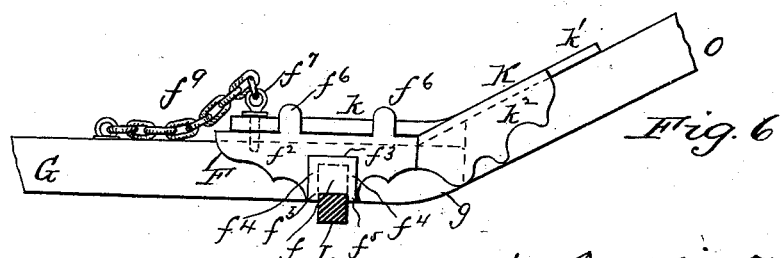
Fig. 6
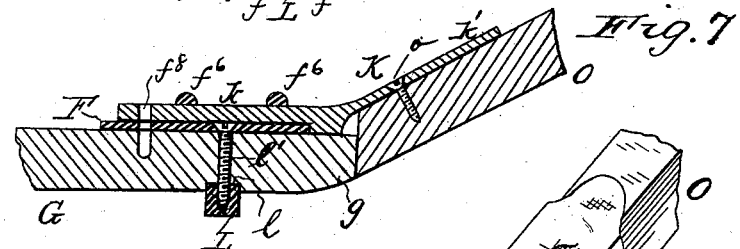
Fig. 7
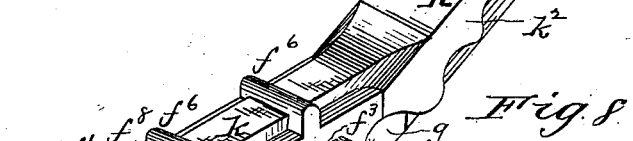
Fig. 8
WITNESSES:
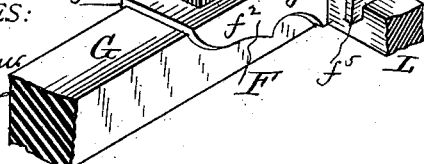
INVENTOR
Ella J. Banks
administratrix of
Charles M. Banks deceased
By S. J. VanStavoren
ATTORNEY
N. PETERS, Photo-Lithographer, Washington, D. C.

(No Model.) 5 Sheets—Sheet 4.
C. M. BANKS, Dec'd.
E. J. BANKS, Administratrix.
BABY CARRIAGE.
No. 357,566. Patented Feb. 15, 1887.
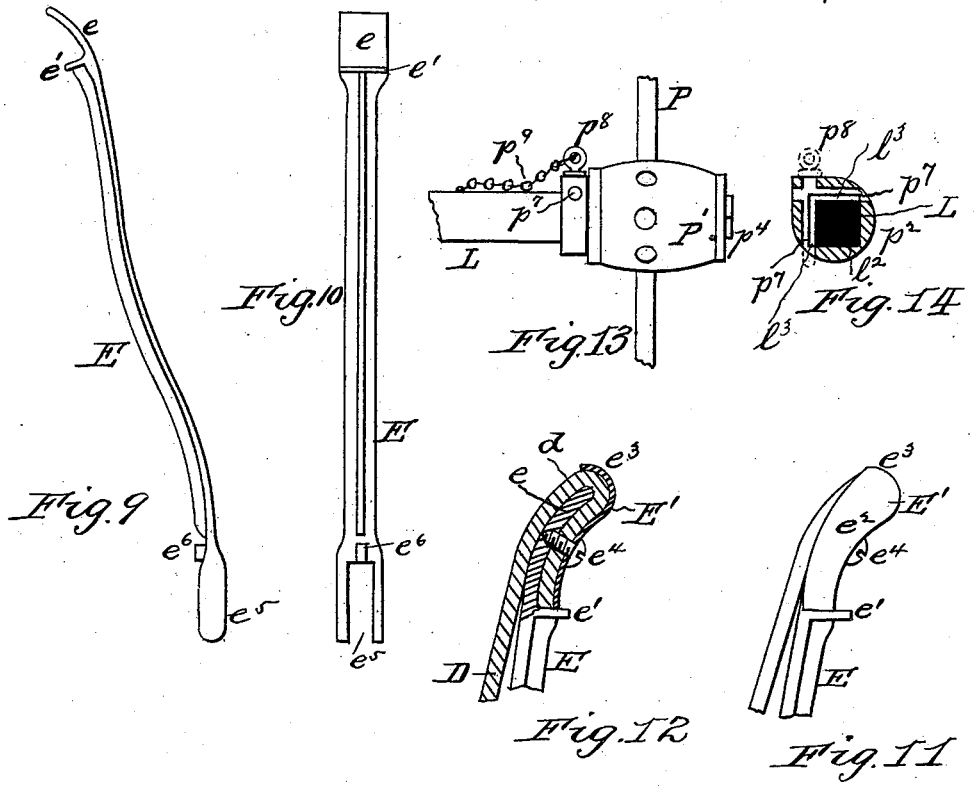
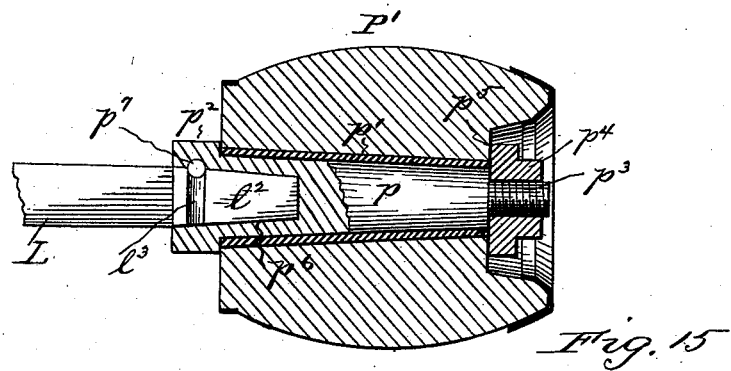
WITNESSES:
Wm H. Van Horn
Chas F. Van Horn
INVENTOR
Ella J. Banks
administratrix of
Charles M. Banks deceased
By S. J. Van Stavoren
ATTORNEY.

(No Model.) 5 Sheets—Sheet 5.
C. M. BANKS, Dec'd.
E. J. BANKS, Administratrix.
BABY CARRIAGE.
No. 357,566. Patented Feb. 15, 1887.
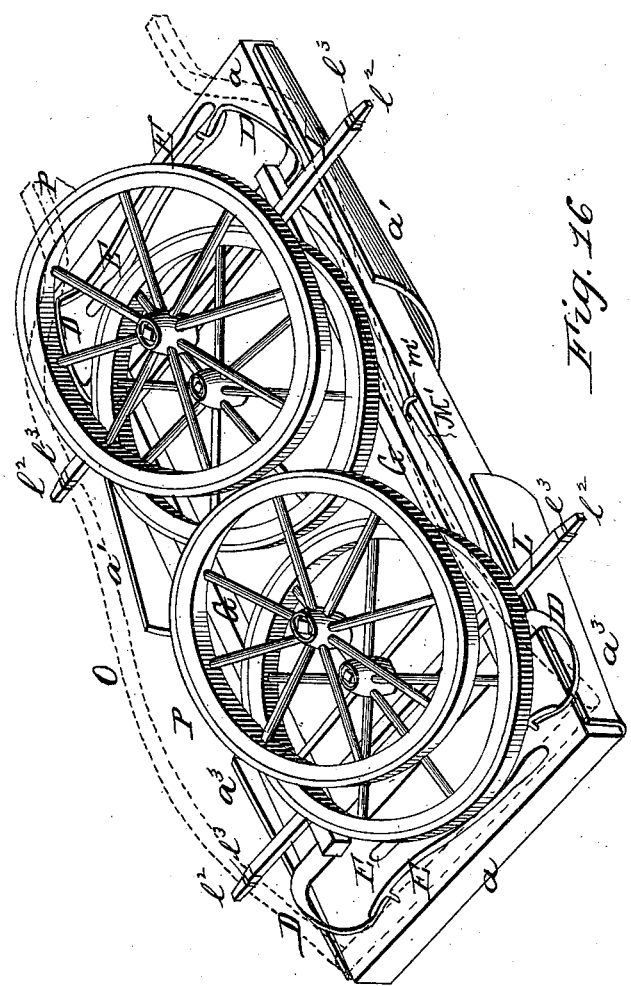
WITNESSES:
INVENTOR

UNITED STATES PATENT OFFICE.

ELLA J. BANKS, OF PHILADELPHIA, PENNSYLVANIA, ADMINISTRATRIX OF CHARLES M. BANKS, DECEASED.

BABY-CARRIAGE.

SPECIFICATION forming part of Letters Patent No. 357,566, dated February 15, 1887.

Application filed July 9, 1886. Serial No. 207,614. (No model.)

*To all whom it may concern:*

Be it known that I, ELLA J. BANKS, a citizen of the United States, residing at Philadelphia, in the county of Philadelphia and State of Pennsylvania, administratrix of CHARLES M. BANKS, late a resident of Philadelphia, in the county of Philadelphia, State of Pennsylvania, deceased, who invented certain new and useful Improvements in Baby-Carriages, do hereby declare the following specification to be a full, concise, and exact description of his invention, which will enable others skilled in the art to which it appertains to make and use the same, reference being had to the accompanying drawings, wherein—

Figure 1:
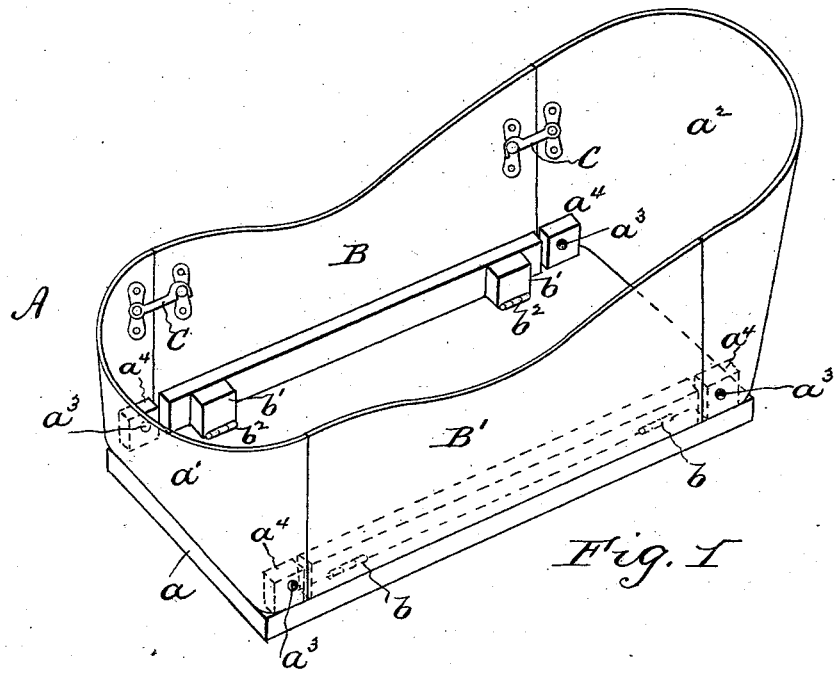
Figure 2:
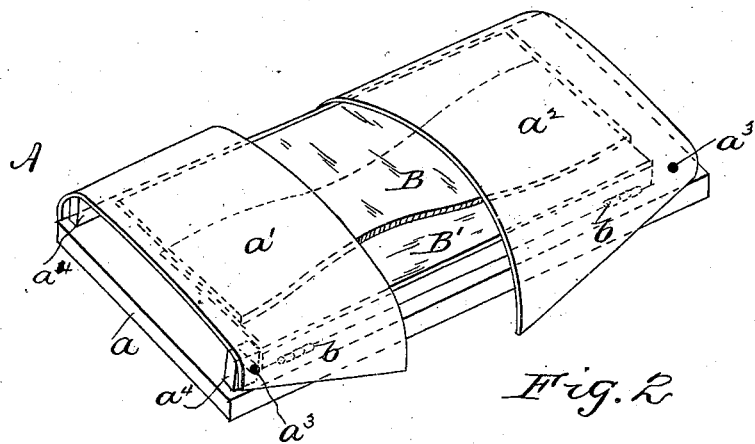
Figure 3:
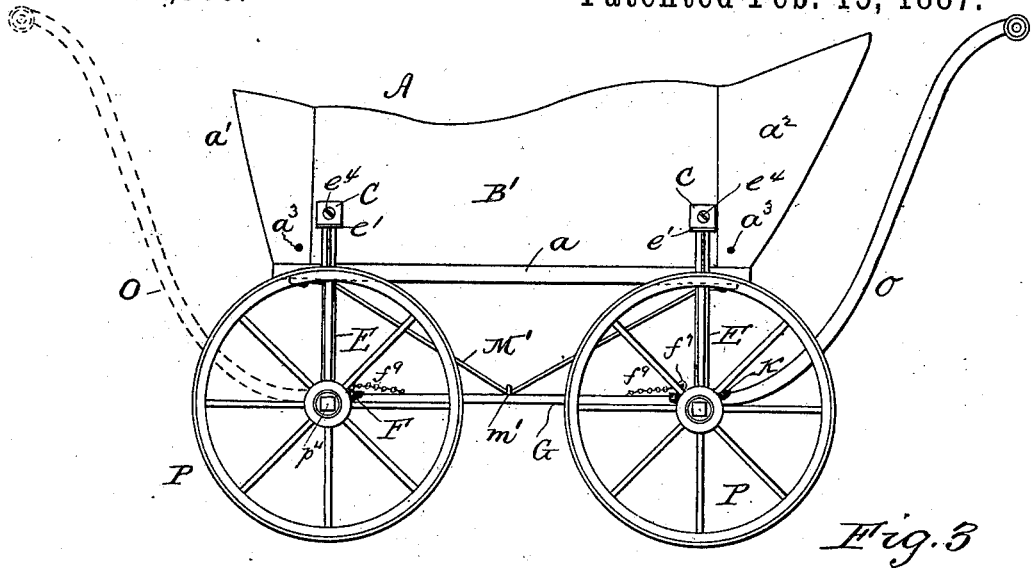
Figure 4:
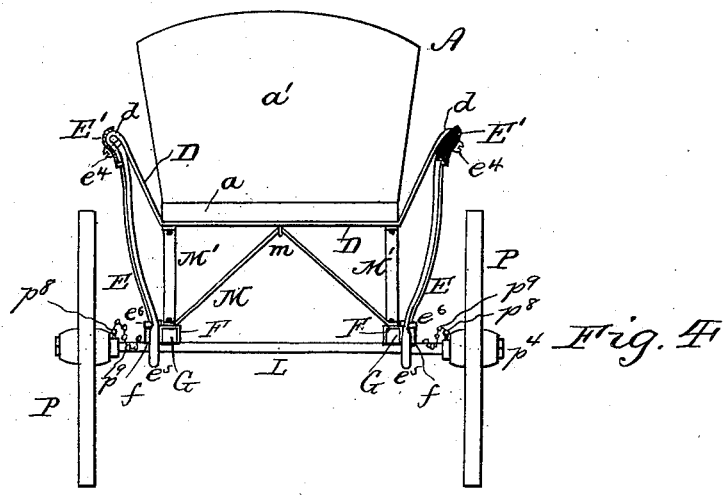

Figure 1 is a perspective showing the parts comprising the body of the carriage opened for use and detached from the running-gear. Fig. 2 is a like view of same, showing the parts folded down or together. Fig. 3 is a side elevation of the carriage. Fig. 4 is a front end elevation. Fig. 5 is a plan of running-gear. Fig. 6 is a side elevation drawn to an enlarged scale, showing meeting ends of a reach and the handle or push-rod and the cast or metal coupling for the same. Fig. 7 is a longitudinal section, and Fig. 8 is a perspective of the same. Fig. 9 is a side elevation showing, in detail, a supporting-bar for the transverse elastic bands for the carriage-body. Fig. 10 is a front view of same. Fig. 11 is an elevation showing upper end of said bar, one end of an elastic band, and cap connecting the end of the band to the bar. Fig. 12 is a section of the same. Fig. 13 is a plan showing an end of an axle, part of a wheel, and coupling collar and pin securing the wheel to the axle. Fig. 14 is a cross-section of the axle and coupling-collar. Fig. 15 is a section through the hub of a wheel, showing more plainly the coupling between the same and the axle; and Fig. 16 is a perspective showing the parts of the carriage folded together for transportation, storage, or other purposes.

This invention has relation to that class of baby-carriages or perambulators which are adapted to be folded together or knocked down into compact shape for transportation and storage purposes—a form of which is shown and described in United States Letters Patent issued to Charles M. Banks, bearing date May 11, 1886, No. 341,824; and it has for its object simplicity of construction and arrangement of parts, whereby an economical, durable, and desirable form of baby-carriage is provided, the parts of which are easily and expeditiously taken apart and folded together in compact shape when not in use, and which are correspondingly replaced and unfolded or opened.

The invention accordingly consists of the combination, construction, and arrangement of parts, as hereinafter described and claimed.

In the drawings, A represents the carriage-body, composed of a bottom board, $a$, curved or bowed ends $a'$ and $a^2$, which on their inner sides and near to the bottom board, $a$, are pivoted or hinged, as shown at $a^3$, in any suitable manner to cheek pieces or blocks $a^4$, suitably secured to or forming part of the bottom board, $a$. The sides B and B', between these ends $a'$ $a^2$, are also hinged or pivoted to the bottom board, the side B' being hinged directly thereto, as indicated at $b$, and the side B having inwardly-projecting cheek pieces or blocks $b'$, which are hinged, as shown at $b^2$, to the board $a$. These cheek pieces or blocks for side B are employed to provide for folding the side B over the side B' after it has been turned down to and rests flat upon the board $a$.

Suitable catches, clasps, or other fastening devices, C, are provided for locking the meeting edges of the sides B B' and ends $a'$ $a^2$. These catches are preferably placed within the body of the carriage or upon the inside of the parts comprising the same, as indicated in Fig. 1, and they serve to maintain the ends and sides of body A in rigid or firm position when opened or unfolded. The hinged sides and ends of the carriage-body may be of wood, wicker-work, or any other desired material, and suitably upholstered, as fancy dictates.

To fold the carriage-body, the fastenings or catches C are first loosened, the side B' is then turned down to the bottom board, $a$, the side B turned down upon the side B', and the ends $a'$ $a^2$ folded down thereon, as shown in Fig. 2.

The sides B B' and curved or bowed ends $a'$ $a^2$ flare outwardly from below upwardly, as shown more plainly in Figs. 3 and 4, and the bowed ends $a'$ $a^2$ preferably extend part way along the sides of bottom board, $a$, to meet the sides B B'.

The hinging of the sides B B', to provide for closing or turning them down first, admits of the use of the curved or bowed ends $a'$ $a^2$, and they may have any curved form and flare or incline outwardly from bottom to top and extend part way along the sides of bottom board, $a$. Their ends or edges adjacent to the meeting ends of sides B B' in folding pass down outside of the bottom board, as plainly indicated in Fig. 2, to fold into a compact form, as shown in Fig. 2, the outer upper part of the sides or edges of the ends $a'$ $a^2$ taking the position outside of and extending below the bottom board, $a$, as illustrated in said figure, by reason of said ends being extended around to form part of the sides of the carriage, and, further, by inclining or flaring outwardly from their bottom to their top edges. In unfolding said parts the operation is the reverse of that above described.

The carriage-body is supported upon transverse elastic bands D, there being one at each end, and are secured to or rest loosely upon the under side of bottom board, $a$, in any suitable manner. The ends $d$ of these elastic bands D are secured to the upper extremities of suitably-curved or other appropriate configured bars E E by means of caps E'. To secure a strong connection between these parts the upper ends, $e$, of bars E are provided with shoulders or ledges $e'$, forming curved or outwardly-flaring upper ends, $e$, for said bars, around which the ends $d$ of the bands are laid, and the caps E' have side and top flanges, $e^2$ $e^3$, respectively, to tightly fit the ends $e$ of the bars E and inclose the ends $d$ of the bands. The caps E' are held in place by screws $e^4$, passing through the caps and ends of the bands and engaging with the ends $e$ of the bars E, as plainly shown in Figs. 13 and 14. The caps E' therefore bind or clamp the ends of the bands firmly to the ends $e$ of bars E, and as said ends $e$ are curved or flared outwardly, the stronger the pull on the ends of the band the tighter they are clamped.

The lower ends of bars E are bifurcated or forked, as shown at $e^5$, and have a nib or teat, $e^6$, on their front side. The forked ends $e^5$ of the bars E engage with square or rectangular lugs $f$, projecting laterally from brackets F on the ends of the reaches or longitudinal rods G, connecting the front and rear axles L L. There are, preferably, two reaches, one on each side, instead of a central one, as shown in said patent, and they are preferably made of wood, having lower beveled corners at their ends, as indicated at $g$, Figs. 7 and 8.

The brackets F for the ends of the reaches are of metal and consist of top plates, $f'$, having sides or flanges $f^2$, to embrace the sides of the reaches, and on the outer one of the sides or flanges $f^2$ are formed the lugs $f$. The outer ends of these lugs are provided with top and side flanges, $f^3$ and $f^4$, the latter of which are continued down below the under sides of the lugs to form two nibs or teats, $f^5$. The bottom sides of the reaches are grooved, as shown at $l$, the sides of which, as well as the bracket-nibs $f^5$, fit over or embrace the axles, to secure firmness. The bracket F at each end of the reaches is secured to the reach, and the end of the reach to the axle by a single screw, $l'$, as more plainly shown in Fig. 7. The forked ends $e^5$ of the bars E are firmly but loosely held upon the lugs $f$, as said ends are supported by the lug-flanges $f^3$ $f^4$ and by the sides of the brackets adjacent to the bars, and also by the nibs or teats $e^6$, resting upon top of flanges $f^3$. (See Fig. 4.) The upper sides of the brackets F are provided with metal loops $f^6$, for receiving or making a coupling with the metal straps $k$ on brackets K, secured to the ends of the handle or push-rod O by screws $o$. These brackets K are composed of top plates, $k'$, of which the straps $k$ form a continuation, and have side flanges, $k^2$, to fit the ends of the push-rod O, and the ends of the reaches enter between the side flanges, $k^2$, of the brackets K when coupled to brackets F, to provide a strong coupling for said parts, which couplings are maintained by a removable pin, $f^7$, passing through openings $f^8$ in said straps and in the tops of brackets F, as plainly shown in Fig. 6. By removing these pins $f^7$ the handle or push-rod O may be disconnected from the carriage, and as both ends of the reaches are provided with the brackets F the handle or push-rod may be coupled to either end, as desired. The pins $f^7$ are fastened to the reaches by chains or other flexible connections $f^9$, to prevent losing or misplacing them.

To stiffen the supports for the body A, or to make it more or less rigid, end and side flexible straps or braces, M and M', respectively, are provided. The end or cross-straps, M, are secured at their middle, $m$, to the under side of the bottom board, $a$, and their ends fastened to the reaches, as shown in Fig. 4. The side straps, M', are secured to the middle of reaches, as indicated at $m'$, and their ends fastened to the under side of the bottom board near their ends. (See more plainly Fig. 3.) These straps or braces M M' prevent undue lateral and longitudinal rocking motion of the carriage-body.

The wheels P are removable from the axles, and to provide for this each wheel-hub P' is furnished with a permanently-attached journal, $p$, which is only removed for oiling purposes, and is preferably inclosed in a tubular sleeve, $p'$. The journal $p$ has a collar, $p^2$, on its rear end, and is held in place by thread $p^3$ and nut $p^4$ on its opposite end, the hub P' at this end being preferably recessed to receive the nut and to form an abutting shoulder, $p^5$, for the same, as plainly shown in Fig. 15. The rear end of the journal $p$ is formed with an axial socket, $p^6$, preferably conical in outline and square or oblong in cross-section to receive a correspondingly-formed axle end, $l^2$. In the sides of the axle end $l^2$ are provided channels or recesses, as indicated at $l^3$. In line with the same, in the journal-collar, are right-angle holes or channels $p^7$ for a pin, $p^8$, which secures the wheel or its journal to the axle end $l^2$ so as to be removable therefrom. The two openings $p^7$ in collar $p^2$ are provided to admit of ready coupling of the wheel to the axle. These pins $p^8$ are provided with chain or flexible connections, $p^9$, with the axles L, to prevent losing or misplacing the pins when the carriage is knocked down.

The handle or push-rod O may be of any suitable form, as desired, but is preferably bent at or near its lower ends, or those coupled to the reaches.

The operation of knocking down the carriage into compact form for transportation or storage is substantially as follows: The sides and ends of the body are first folded as above described, and as shown in Fig. 2, the handle or push-rod O being first removed; or this can be done after the body is folded. The pins are taken out from the journal-collars and the wheels removed. The bars E are then pulled off of the bracket-lugs $f$, whereupon the folded body A is turned over to bring its bottom side up, and upon this are laid or folded the axles L, elastic bands D, and braces M M', and upon them the wheels P are placed, as shown in Fig. 16. If desired, the handle or push-rod is laid upon the same, as indicated by dotted lines in said figure, and the whole is strapped, boxed, or otherwise similarly secured together. If not so secured it is put away, and in this condition or compact form takes up but little space.

To set the carriage up, the above-described steps are reversed, and as the pins $f^7$ and $p^8$ are chained or secured to appropriate parts of the carriage, they are always in reach for immediate use, and cannot be mislaid.

What I claim is—

1. The carriage-body A, supported upon transverse elastic or flexible bands attached to upright side bars, which are loosely secured to the running-gear, so as to be removable therefrom, substantially as set forth.

2. The combination of carriage-body A, running-gear, upright bars E, having lower forked ends, and straps D, substantially as set forth.

3. The combination of carriage-body A, running-gear for said body, upright arms or bars E, loosely secured to and removable from the running-gear, and bands D, attached to bars E and affording support for body A, substantially as set forth.

4. The combination, with body A and its running-gear, of bars E, straps D, and end and side braces, M M', substantially as set forth.

5. In a carriage, the arms or bars E, secured to the running-gear of the carriage and removable therefrom, and having caps E', in combination with bands D and carriage-body A, substantially as set forth.

6. The arm or bar E, having forked end $e^5$ and curved upper end, $e$, substantially as and for the purpose set forth.

7. The arm or bar E, having forked end $e^5$, curved end $e$, and cap E', substantially as and for the purpose set forth.

8. The arm or bar E, having forked end $e^5$, nib or teat $e^6$, ledge $e'$, and cap E', substantially as and for the purpose set forth.

9. In combination with the arm or bar E, having ledge or shoulder $e'$, the cap E', having edge flanges $e^2 e^3$, substantially as and for the purpose set forth.

10. The combination of body A, arms E, bands D, and a cap and screw connection between said bands and arms, substantially as set forth.

11. In a carriage, brackets F, having lugs $f$, arms E, loosely secured to said lugs, and body A, supported by said arms E, substantially as set forth.

12. In a carriage, the combination of brackets F, having lugs $f$, reaches G, arms E, fitting said lugs, bands D, and body A, substantially as set forth.

13. In a carriage, the combination, with reach G, of end brackets, F, having side lugs, $f$, and means for fastening the bracket to the reach and the latter to running-gear of the carriage, substantially as set forth.

14. The combination of reach G and the end brackets, F, having side lugs, $f$, provided with flanges $f^3 f^4$, substantially as set forth.

15. The combination of reach G, having grooves $l$ in its under side, the brackets F, having lugs $f$, with flanges $f^3 f^4$, and nibs or teats $f^5$, substantially as set forth.

16. The combination of reach G, the brackets F, having loops $f^6$, push-rod O, having brackets K, provided with strap $k$, and fastening-pins $f^7$, substantially as set forth.

17. The combination of reach G, rod O, coupling-brackets F and K, and pins $f^2$, having chain-connections $f^9$ with said reach, substantially as set forth.

18. The axle L, having end $l^2$, angular in cross-section, with grooves $l^3$, in combination with wheel P, having journal $p$, provided with socket $p^6$, angular in cross-section, collar $p^2$, having groove $p^7$, and pins $p^8$, substantially as set forth.

19. In a knockdown carriage, the axle and wheel coupling-pins $p^8$ and push-rod coupling-pins $f^7$, having chain or flexible connections with suitable parts of the carriage, substantially as and for the purpose set forth.

20. In a knockdown carriage, the combination of a folding body, removable arms E, bands D, axles L L, having reaches G, and wheels P, removable from said axles, substantially as set forth.

21. The carriage-body A, having a bottom board, $a$, ends $a' a^2$, hinged to said bottom board and extending part way along its sides, sides B B', hinged to bottom $a$, said sides and ends flaring outwardly from below upwardly, and inside fastening-catches for said sides and ends, substantially as set forth.

22. The carriage-body A, having bottom board, $a$, bowed ends $a' a^2$, hinged to said bottom and extending part way along the sides of same, sides B B', hinged to bottom a, said sides and ends flaring outwardly from below upwardly, and fastening devices for said ends and sides, substantially as set forth.

23. A folding carriage-body supported upon transverse elastic bands, combined with upright bars and cap attachment for securing the ends of the bands to the bars, substantially as set forth.

24. The bottom board, $a$, having cheek-pieces $a^4$, ends $a'$ $a^2$, pivoted to said cheek-pieces, side B and side B', having cheek-pieces $b'$, hinged to board $a$, and catches C, substantially as set forth.

In witness whereof I have hereunto set my mark this 14th day of June, 1886.

her
  ELLA J. ✕ BANKS,
      mark
*Administratrix of Charles M. Banks, deceased.*

Witnesses:
 JOHN RODGERS,
 S. J. VAN STAVOREN.